US006263505B1

(12) United States Patent
Walker et al.

(10) Patent No.: US 6,263,505 B1
(45) Date of Patent: *Jul. 17, 2001

(54) SYSTEM AND METHOD FOR SUPPLYING SUPPLEMENTAL INFORMATION FOR VIDEO PROGRAMS (75) Inventors: Jay S. Walker, Ridgefield; James A. Jorasch, Stamford; Robert R. Lech, Norwalk; Thomas M. Sparico, Riverside, all of CT (US)

(73) Assignee: United States of America, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,006

(22) Filed: Jul. 3, 1997

Related U.S. Application Data (63) Continuation-in-part of application No. 08/821,436, filed on Mar. 21, 1997, now Pat. No. 6,209,028.

(51) Int. Cl.[7] .............................. H04N 7/14; H04H 1/02
(52) U.S. Cl. ........................... 725/110; 725/115; 725/116
(58) Field of Search .......................... 395/200.47–200.49; 348/1, 2, 6, 7, 8, 9, 10, 12, 13, 460, 468, 553, 722; 455/2, 3.1, 4.1, 4.2, 5.1, 6.1, 6.2, 6.3; 386/1, 4, 46, 52; 709/217–219

(56) References Cited

U.S. PATENT DOCUMENTS

| 4,349,701 | 9/1982 | Snopko . |
| 4,389,679 | 6/1983 | Missan et al. . |
| 4,734,764 | 3/1988 | Pocock et al. . |
| 4,839,733 | 6/1989 | Karamon et al. . |
| 5,055,939 | 10/1991 | Karamon et al. . |
| 5,393,073 | 2/1995 | Best . |
| 5,410,343 | 4/1995 | Coddington et al. . |
| 5,438,355 | 8/1995 | Palmer . |
| 5,509,060 | 4/1996 | Hall et al. . |
| 5,513,384 | 4/1996 | Brennan et al. . |

(List continued on next page.)

OTHER PUBLICATIONS

Kurtz, Josh, "A Way to Hear Stock Quotes While Watching Cartoons", The New York Times, Apr. 14, 1991—Late Edition, Section 3, p. 8, col. 1.

Britton, Bonnie, "Special Videos Narrate the Action for Viewers with Visual Impairments", The Indianapolis Star, Oct. 15, 1995, p. 104.

"Dow Jones Investor Network Broadcasts Greenspan Live Tonight" Business Wire, Oct. 19, 1995.

"General Instrument Corporation Reports Record Fourth Quarter and Full Year 1994 Results; Fourth Quarter Sales up by 32 Percent over 1993; Net income up 44 Percent before Income Tax Benefit", PR Newswire, Feb. 1, 1995.

(List continued on next page.)

Primary Examiner—John W. Miller
(74) Attorney, Agent, or Firm—Steven M. Santisi; Joseph F. Haag (57) ABSTRACT An apparatus, method, and program for providing supplemental information related to video programs. Through a computer network interface, a user can request and receive specific supplemental audio/video information related to a video program. Alternatively, the supplemental audio/video information can be retrieved from a CD-ROM, or similar storage device. The video program can be, for example, a live broadcast television program or a time-shifted tape recording of a television program. The supplemental information is synchronized to the video program by using a time code which is integrated with the video program. This enables the supplemental information to be viewed and/or listened to in harmony with the events or action of the video program.

43 Claims, 5 Drawing Sheets

U.S. PATENT DOCUMENTS

| | | |
|---|---|---|
| 5,559,949 | 9/1996 | Reimer et al. . |
| 5,561,709 | 10/1996 | Remillard . |
| 5,570,295 | 10/1996 | Isenberg et al. . |
| 5,594,660 | 1/1997 | Sung et al. . |
| 5,596,419 * | 1/1997 | Yoshimura et al. .................. 386/52 |
| 5,596,705 | 1/1997 | Reimer et al. . |
| 5,677,739 * | 10/1997 | Kirkland .......................... 348/553 X |
| 5,712,950 | 1/1998 | Cookson et al. . |
| 5,731,846 * | 3/1998 | Kreitman et al. ................ 348/722 X |
| 5,774,170 * | 6/1998 | Hite et al. ................................ 348/9 |
| 5,809,471 | 9/1998 | Brodsky . |
| 5,815,634 | 9/1998 | Daum et al. . |
| 5,900,908 * | 5/1999 | Kirkland .......................... 348/553 X |

OTHER PUBLICATIONS

Stern, Christopher, "Cable Operators Look for Other Revenue Streams", Broadcasting and Cable, Jul. 26, 1993, vol. 123, No. 30, p. 96.

Parisi, Paula, "Venevision into US PPV", Hollywood Reporter, Dec. 29, 1992.

Audio Hotline, www.multimedia.dowjones.com/hotline/html, Download Date: Mar. 31, 1997.

"Dow Jones Investor Network Debuts on Multimedia Division Home Page", Business Wire, Aug. 29, 1995.

www.xensei.com/profile.

Hyper TV, www.hypertv.com, Download Date: Mar. 24, 1998.

PCT International Search Report for ApplicationNo. PCT/US98/05112 dated Aug. 12, 1998.

"HyperTV" (http://www.hypertv.com), download date: Mar. 24, 1998.

* cited by examiner

| SERIES ID  F1 | EPISODE ID  F2 | BEGIN TIME CODE  F3 | END TIME CODE  F4 | EVENT INSTRUCTION  F5 |
|---|---|---|---|---|
| SNFD | 0025 | 00:01:50 | 00:02:30 | SHOW_CLOSEUP (JERRY) |
| SNFD | 0025 | 00:02:30 | 00:03:15 | SHOW_MENU (PRODUCTS) |

FIG. 5

SYSTEM AND METHOD FOR SUPPLYING SUPPLEMENTAL INFORMATION FOR VIDEO PROGRAMS

RELATED APPLICATIONS

This application is a Continuation-In-Part of U.S. patent application entitled "System and Method for Supplying Supplemental Audio Information for Broadcast Television Programs" filed Mar. 21, 1997, application Ser. No. 08/821,436 now U.S. Pat. No. 6,209,028.

BACKGROUND OF THE INVENTION

This invention relates to the field of video programs. More particularly, the present invention provides a system and method for video program viewers to receive supplemental information, via a computer data communication network, that is synchronized to the action and events of the video program.

Many broadcast television and video cassette programs (e.g., rented movies) are regularly watched by large audiences. Considering the growing number of TV sets and video cassette recorders (VCR) in homes and the amount of time the average person spends watching TV, the size of the audience is expected to increase over time. Correspondingly, programs need to change and evolve to suit the ever-more diverse tastes and interests of this expanding audience.

Advertisers, broadcasters and video program producers are constantly looking for ways to enhance the viewing experience of their programs. Moreover, they are looking for ways to differentiate and promote their programs over those of their competitors. For example, television networks, cable companies and independent program providers offer a myriad of program categories to capture the interest of viewers. These program categories include, for example, game shows, talk shows, situation comedies, sporting events, soap operas, movies and educational programs. The ultimate goal is to provide interesting programming, in order to capture a large segment of the viewing audience.

In recent years, the Internet has received a great deal of attention. The Internet is a vast and expanding network of computers and other devices linked together by various media, enabling all the computers to exchange and share data. The Internet provides an enormous amount of information about a myriad of corporations, products and services, as well as educational, research and entertainment information. It is estimated that more than 30 million people worldwide now use the Internet with 100 million predicted to be on the "net" within a few years.

One way to establish a presence on the Internet is by placing a web site on a host operating a web server within a given domain name (e.g., "USPTO.gov"). A web site consists of one or more web pages, which are basically computer data files. A web page is identified by a unique Internet address commonly referred to as a Uniform Resource Locator ("URL"). When the web server receives an inquiry from the Internet, it returns the web page data to the computer making the inquiry. The web page may comprise multiple pages of information including messages, hyperlinks (i.e., automatic links that permit jumps from one web page to another), audio and graphical information, and combinations thereof.

In this regard, some advertisers and producers of television programs, movies and video programs have created web sites to promote and to provide additional information concerning their respective programs or projects. For example, an Internet user can access a web site related to his favorite TV show (e.g., "http://www.spe.sony.com/pictures/tv/seinfeld.htm") to get an episode schedule, get more information about the TV show's characters and actors, and find out about up-coming special events. Web sites have also been created which allow Internet users to gather additional information about products or services that are advertised in television commercials.

Television advertisers having associated web sites often display the Internet address, or URL of an associated web site during television advertisements. With the URL, a prospective customer can access the advertiser's web site to receive additional information about the advertiser, the advertised product and/or related products.

As these web sites make clear, advertisers, producers and developers of video programs have the potential to provide the viewer with far more information than can be practically accommodated by conventional television or video cassette programs. For example, the typical TV program format makes it difficult to provide intricate details concerning the plot or characters within the program, because the story-line must flow in a relatively quick and fluid manner. Unlike a novel, where an author can devote extensive time to a given character, item, or event, the dialogue in TV programs must flow in a real-time manner. In many situations, this means that the writers must provide only a brief summary of a character, item or event to fit within the limitations of a television program and keep the action flowing smoothly.

In contrast to broadcast television or video cassette programs in which playing time is premium, a web site providing supplemental information is not so constrained. In this regard, a system known as HyperTV has been disclosed which enables television viewers to view web pages that are launched at the time of a broadcast television program. This system allows a viewer to select additional information related to a television program at the time of its original broadcast.

Another system, Intercast, has been developed which integrates content of a web page with a broadcast TV signal using the vertical blanking interval ("VBI") of the television signal. This system utilizes an undisplayed portion of the received signal to transmit data to a television receiver. Like HyperTV, this system enables a viewer to view the content of a web site related to the particular program at the time of the broadcast.

Although these systems provide additional content to a viewer of a broadcast television program, they have significant shortcomings. Presently, these systems provide additional information related to the television program, such as live chat lines, on-demand audio and video clips, and online shopping, but these systems fail to provide supplemental information synchronized with the action and events occurring within a particular video program.

In addition, the Intercast system requires sophisticated video decoding circuitry to extract transmitted data from the VBI. The Intercast system further requires circuitry to allow the user to interface with the television receiver and send viewer requests upstream to a service provider.

Further, both Intercast and HyperTV require the viewer to view the television program at the time of the original broadcast to receive synchronized information. A viewer wishing to time-shift his viewing of a television program, for example, using a VCR, cannot receive synchronized additional information from any of the prior art systems.

The failure of these system to provide synchronized supplemental information is a major disadvantage. To more fully enhance the viewer's experience, the supplemental information discussed above must be provided at the proper times to correspond with the action and events of the video program.

A wealth of non-broadcast material (or non-video-taped material) could be created and used to supplement conventional video programs. In the example discussed above, additional audio and visual tracks could be used to provide the supplemental information desired by the viewer. Although, this supplemental information must be synchronized to the action and events occurring in the video program so that the viewer can receive this information at the proper times.

SUMMARY OF THE INVENTION

The present invention solves the foregoing deficiencies by providing a system and a method for enabling video program viewers to receive synchronized supplemental information related to video programs. The present invention advantageously enables video program viewers to request and receive the synchronized supplemental information through a computer data communication network interface.

In particular, one aspect of the present invention is directed to a method of supplying supplemental audio and visual information that is synchronized to a video program. This method includes providing program identification and synchronization information integrated with the video program. The viewer makes a request for the supplemental information through a computer data communication network. The viewer provides the program identification and synchronization information integrated with the video program being viewed. The viewer then receives the requested supplemental information synchronized to the video program through the computer data communication network. This method allows the supplemental information to be synchronized to a live broadcast television program or a pre-recorded video tape program, such as a rented movie or a time-shifted playback of a television program.

Another aspect of the present invention allows the viewer to interactively change the supplemental information as it is being received. This embodiment allows the viewer to make additional requests at certain times throughout the video program to, for example, skip or modify certain portions of the supplemental information.

The present invention also provides an apparatus which integrates the video program and the supplemental information on the same monitor. In this aspect, the program identification and synchronization information are automatically extracted from the video signal, which eliminates the need for the viewer to provide this information separately.

It is an advantage of the present invention to provide synchronized supplemental information on a web site. Such information would be of great interest to devoted fans of TV programs, for example, who would like more detail about the characters, items and events within a program, and not just additional, general information.

It is an additional advantage of the present invention to provide a system which increases the amount of information available about a video program, thereby creating even greater interest in a particular TV or video program.

It is a further advantage of the present invention to enable advertisers to provide additional information on products promoted during a video program. In addition, the present invention enables an advertiser who could not otherwise afford television commercial time a means for affiliating with its product with a video program by advertising on a synchronized web site. Such a web site synchronized to a video program can provide significant additional advertising revenues to broadcasters and video program producers not available using prior art systems.

Other aspects of the present invention are described below.

DETAILED DESCRIPTION OF THE PREFERRED EMBODIMENTS

In a preferred embodiment of the present invention, writers and developers of video programs prepare supplemental information related to TV show episodes, movies, video tape presentations, and the like. This supplemental information comprising additional audio, text, and visual information related to the video program is made available at an Internet web site accessible by the viewers of the video program. Viewers can simultaneously view the video program on a TV receiver, for example, and receive the supplemental information on their computer monitor display.

To illustrate the utility of the present invention consider a situation where the writers and/or director of a murder mystery television program might incorporate a "suicide note" in a particular scene. Due to time constraints, they may be required to quickly flash or briefly summarize the "suicide note" to the viewing audience. If a viewer were able to, however, he may wish instead to slowly peruse the "suicide note" left by the victim. This might give the viewer additional insight into a character or event of the program, or provide additional entertainment by allowing the viewer to speculate as to future events in the program.

In another situation, a particular scene within a video or television program may have multiple characters involved in separate conversations, although, only one conversation can be showcased for the viewers at a time. However, rather than focusing on the particular conversation being showcased at that moment, a viewer may wish to eavesdrop on the other conversations or get a different visual perspective in order to get a better look at or understanding of other characters.

The present invention enables the producers of these video programs to offer a wide variety of additional information about the characters, story-lines and other aspects of their video program while being less hampered by the inherent constraints of a video program such as time, story development and continuity. A few of the possible forms of supplemental information that can be supplied to the viewing public are shown by the following examples:

Close-ups of specific items: As discussed above, a viewer may wish to slowly read and examine a "suicide note" left by a character in a murder mystery video program. Viewers of a medical drama may wish to view the medical records or test results, which are not shown to the viewers, of a patient being examined by a doctor on the show. Advertisers, sponsors and producers may provide close-ups of props along with related information, such as the history of the prop in the program or sales information related to purchasing the prop.

Alternative camera angles: This enables the viewer to focus on areas of the video program that are in the background or that are only quickly scanned in the video program. For example, during a legal drama, viewers may wish to focus on the defendant's or jury's reaction to certain evidence or testimony, rather than an overview camera angle of the courtroom.

Alternative scenes and dialogue: Viewers can enhance enjoyment of their favorite TV programs by following their favorite characters throughout the show. When, for example, that character leaves the scene to go to a new location, the viewer may elect to receive supplemental visual and audio information related to that character's action in the new location which is not seen by the conventional viewing public. Further, supplemental visual and audio information such as out-takes, edited scenes and alternative dialog may be provided to enhance the viewing experience.

Interactive games: Viewers may engage in games of skill and trivia related to the particular video program being viewed. For example, online tournaments may be conducted whereby viewers may compete against one another during a broadcast video program. It should be understood that the Internet (or commercial online service provider such as America Online) can provide a back channel allowing the web site to collect and evaluate viewers' answers to determine a winner. The tournament may include questions testing a viewer's knowledge of past programs, questions relating to events occurring during the current program or questions requiring a viewer to predict future events during the current program.

Other types of supplemental information: A running version of the video program's script may be available enabling a viewer to review the text of jokes or parts of dialogue that may have been missed can be reviewed. Mature content and themes not available on regular TV programs may be provided. Supplemental information can also be used to provide additional content, also referred to as "hyper-content," for news-type programs, consisting of information not included in the broadcast (e.g., an unabridged news report or background information). Such supplemental material may be made available specifically during commercial interruptions in the video program to extend the time constraints of the video program.

Supplemental information related to commercials or advertisements: Viewers can receive detailed information concerning the products or services being advertised within the video program. This may also include receiving answers to specific questions about the product, for example, where is the nearest dealer, or how much does a particular option cost. The viewers may also be able to receive coupons related to the products and services, as well as enter sweepstakes related to the advertisements. In addition, the synchronized web pages may provide links to other web pages (i.e. sponsor, producer or network) or links to real-time video stream commercials.

In the present invention, the supplemental information is edited and synchronized to the action and events of the video program. This process ensures that the supplemental information is available to the viewer at the proper times throughout the video program. For example, as discussed above, when a doctor in a video program is viewing a patient's medical records, this information is also made available to the viewer via the synchronized web site. Throughout the video program, the viewer receives supplemental images, audio, dialogue, scenes and information synchronized to the specific actions and events occurring within the video program. This is in contrast to conventional web sites related to TV shows, for example, which only provide general information and are not synchronized to the TV show, even if accessed while viewing the TV show.

Figure 1:
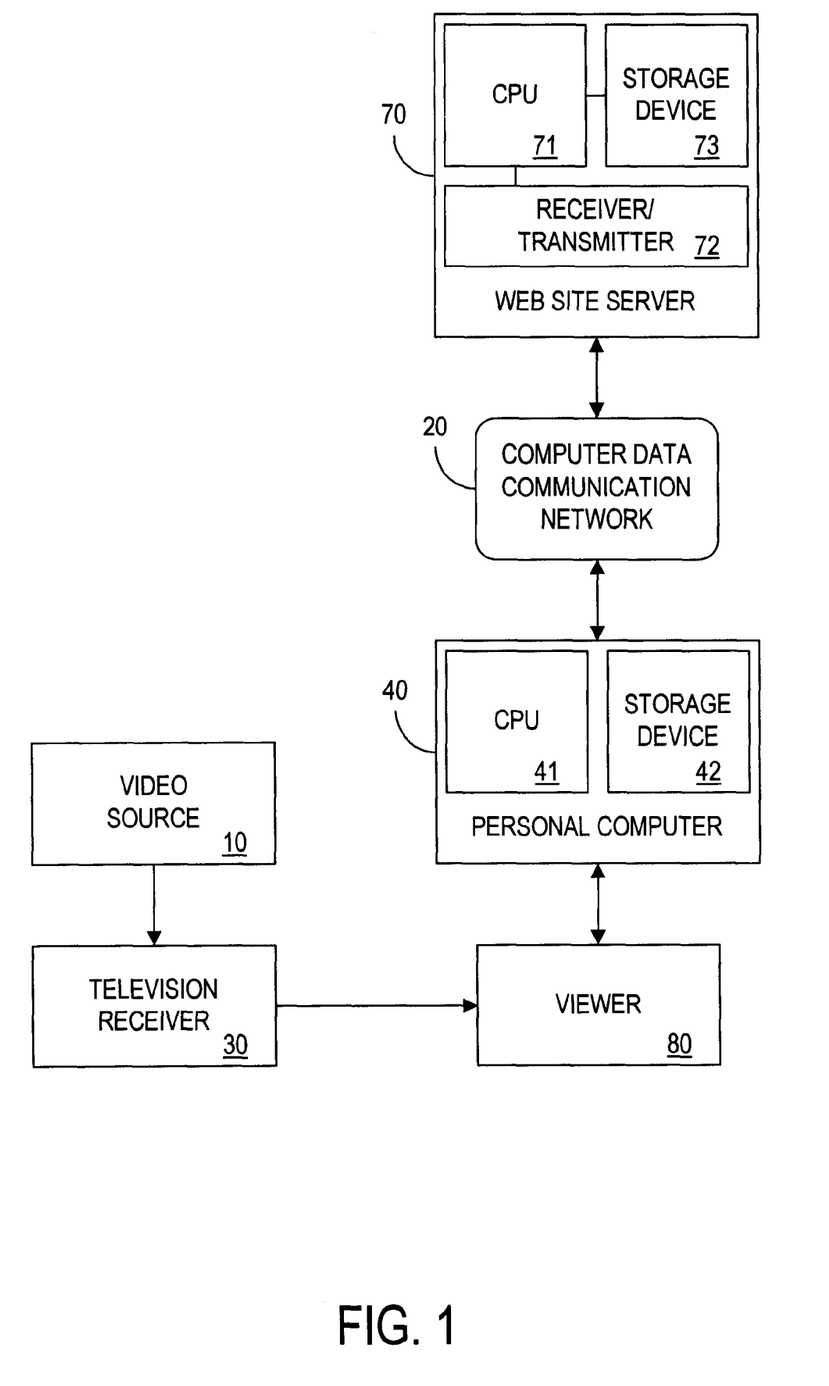
FIG. 1 is a schematic block diagram overview of one system constructed in accordance with the present invention.

Referring now to the drawings, FIG. 1 is a schematic block diagram overview of one system constructed in accordance with the present invention. A television receiver 30 receives a video program from a video source 10 while a viewer 80 observes the video program. While one viewer is depicted receiving the video program from the television receiver 30, it is understood that the video program may be broadcast to and/or viewed by multiple viewers 80.

As depicted in FIG. 1, the video program is received and displayed by the television receiver 30 located in proximity to the viewer. Of course, other types of video signal display devices may be used instead of a conventional television set, such as, a personal computer adapted to receive and display video signals. The television receiver 30 may receive the video program through an antenna adapted to receive TV signals from a TV broadcast station, from a satellite transponder, a trunk cable from a CATV (i.e. cable TV) system, or from any other suitable transmission means, as well as a playback of a pre-recorded program from a video cassette, laserdisc or compact disc.

Figure 2:
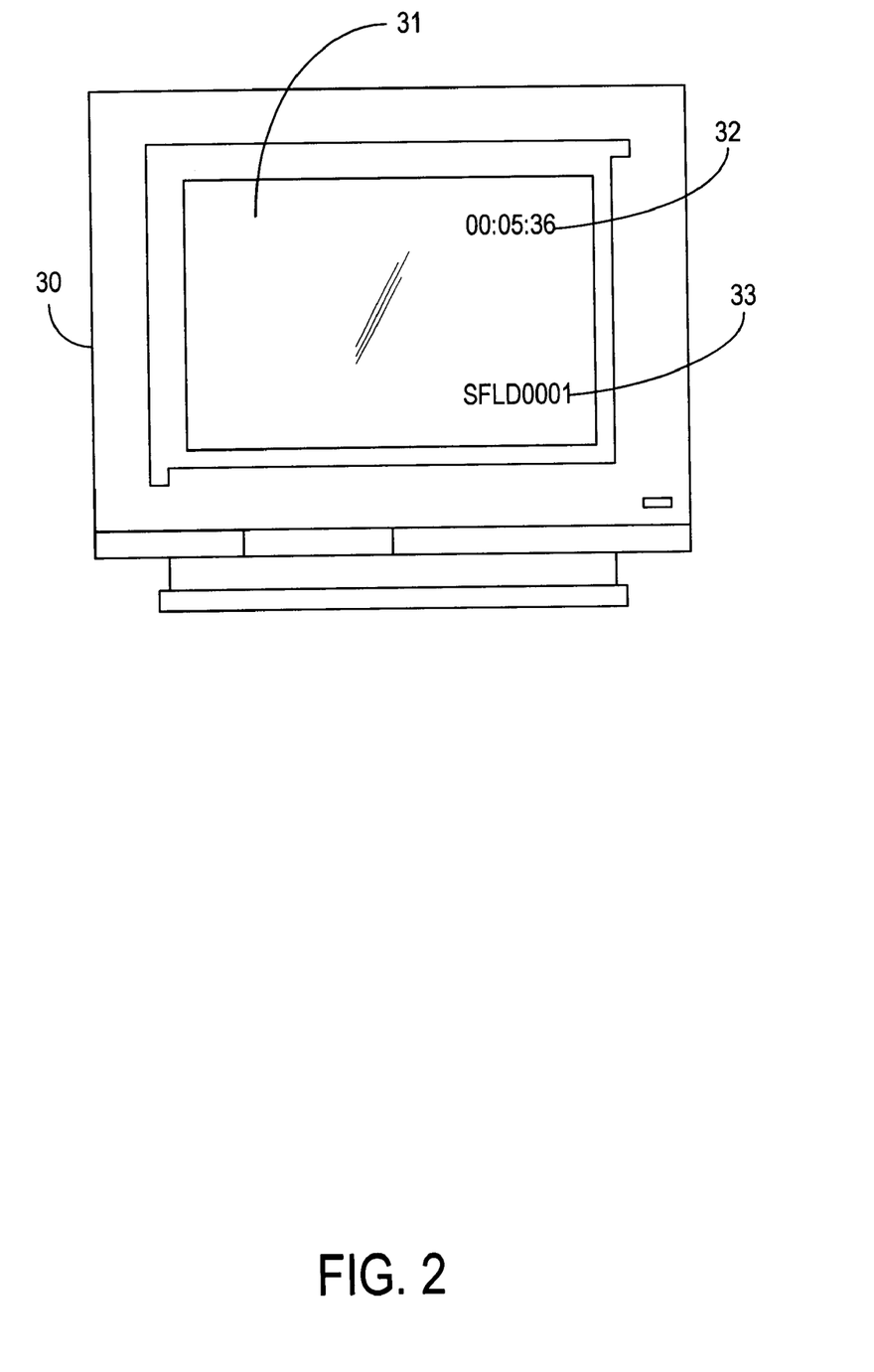
FIG. 2 is a schematic block diagram illustrating the program identification and synchronization information displayed during the video program.

As illustrated in FIG. 2, program identification information 33 and synchronization information 32 are displayed discretely on a display screen 31 of the television receiver 30. This information is integrated with the video program. The location of this information may be anywhere on the display screen 31. The amount of display area consumed by the information (i.e., font size) may also be varied. Program identification information 33 and synchronization information 32 may also be presented in a non-visual machine readable format such as by embedding data in an audio track or using a portion of a video track not displayed on the television receiver 30.

The program identification information 33 and the synchronization information are recorded on the same recording medium as the video program. For example, a television program can be recorded and then the synchronization information can be added during editing of the recorded television program. Alternatively, this information can be added at the time of recording or broadcasting the television program. It is also understood that the program identification information 33 and the synchronization information 32 would be presented even if the video program is recorded on a recorded medium and played-back by the viewer.

As shown in FIG. 2, the program identification information 33 is an eight digit alphanumeric code uniquely representing the particular video program being displayed. It is understood that other types of identification tags may be used to distinguish video programs from each other such as graphical images or other symbols. Each video program contains one such code so that viewers can request specific supplemental information related to that video program, as discussed below.

The synchronization information 32 comprises a running time-code that is updated on the display screen 31 at predetermined intervals. The preferred interval for updating the time-code is every second. However, other intervals can also be used, for example, the time-code could be updated at specific milestones during the video program such as after each commercial break or every few minutes.

As discussed above, the time-code ensures that the supplemental information is properly synchronized to the video program. It also allows the supplemental information to be synchronized to the video program that has been taped using a video cassette recorder ("VCR"). Therefore, the viewer may receive supplemental information for a TV program while it is being broadcast, or during a time-shifted playback of a previously broadcast TV program.

An example of the time-code in the preferred embodiment is "00:05:36." In this example, the time-code indicates that the supplemental information should be offset by five minutes and thirty-six seconds from the start of the video program. Of course, other time-codes formats can be used as well.

Referring back to FIG. 1., the viewer 80, by utilizing a personal computer 40, communicates over a computer data communication network 20 to a web site server 70. The personal computer 40 includes a CPU 41, and a storage device 42. The web site server 70 includes a CPU 71, a receiver/transmitter 72, and a storage device 73. The web site server 70 provides for storage of the supplemental information related to the various video programs on a server connected to the Internet. The supplemental information is stored in units, referred to as "web pages," which may include textual, graphic, audio and/or video information and hyperlinks to other information related to the particular video program. Specific portions of the web pages such as hyperlinks may be activated in synchronization with certain events during the video program.

Viewer 80 can access the web site server 70 through conventional interface software called a "web browser" or other data communication protocol means. To gain access to the web site server 70, for example, viewer 80 specifies the Internet address or URL associated with the web page to the web browser. The browser then communicates with the relevant web site server 70 containing the web page data. A modem (not shown) or similar means can be used to facilitate communication with the web site server 70. In the present invention, the URL of the web site server 70 can be displayed before and/or during the video program. The URL can also be generally distributed in advertisements. For example, the URL can be printed in newspaper and magazine advertisements or displayed during a televised advertisement.

After accessing the web site server 70, viewer 80 is guided by a graphical user interface and icons (not shown) to access the supplemental information stored therein. In particular, viewer 80 provides the program identification information 33 and synchronization information 32, to the web site server 70. In response, the web site server 70 first accesses the particular supplemental information related to the program identification information 33 provided by viewer 80. Then the web site server 70 synchronizes the supplemental information to the action and events occurring in the video program based on the synchronization information 32 (i.e., the time-code). This is accomplished by using the time-code as an offset, as described above. The supplemental information, in the form of web pages, is then sent to viewer 80 via the personal computer 40.

In one embodiment, viewer 80 is prompted for a credit card number to pay for the supplemental information when accessing the web site server 70. Arrangements could also be made for periodic service bills to be mailed to the viewer. Alternative payment mechanisms include billing in conjunction with a 900, 800 or 888 telephone number, Digicash or Cybercash. The revenues generated by the service can be distributed in a variety of ways among the various persons and organizations providing the service (i.e. the video program provider, the Internet service provider, the actors, etc.).

When viewer 80 receives the web pages, the information contained therein preferably corresponds to the action and events occurring in the video program. This ensures that the events contained within the supplemental information coincides with the content of the video program. Each event has a respective begin time and end time which is synchronized to the time-code, as shown in the example below:

| BEGIN-TIME | END-TIME | EVENT |
| --- | --- | --- |
| 00:00:00 | 00:02:00 | display intro. images |
| 00:02:01 | 00:03:36 | show close-up of report |
| 00:03:37 | 00:10:56 | play camera angle #1 |
| 00:10:57 | 00:12:00 | show product menu |
| 00:12:01 | 00:20:00 | play scene #1 |
| 00:20:01 | 00:21:08 | show close-up of note |
| 00:21:09 | 00:26:11 | play audio #1 |
| 00:26:12 | 00:30:00 | display closing images |

Some of the supplemental information contained in the web site server 70 may be selectable by viewer 80. For example, viewer 80 may choose to receive one or more close-ups of several documents, medical reports, suicide notes, etc. These choices are made available at the appropriate times throughout the video program. In addition, viewer 80 may wish to select a particular character within a TV show and receive supplemental scenes and dialogue related to this character. Once again, these scenes are synchronized to accommodate when that character is "in" or "out" of the scene being displayed by the television receiver 30.

Figure 3:
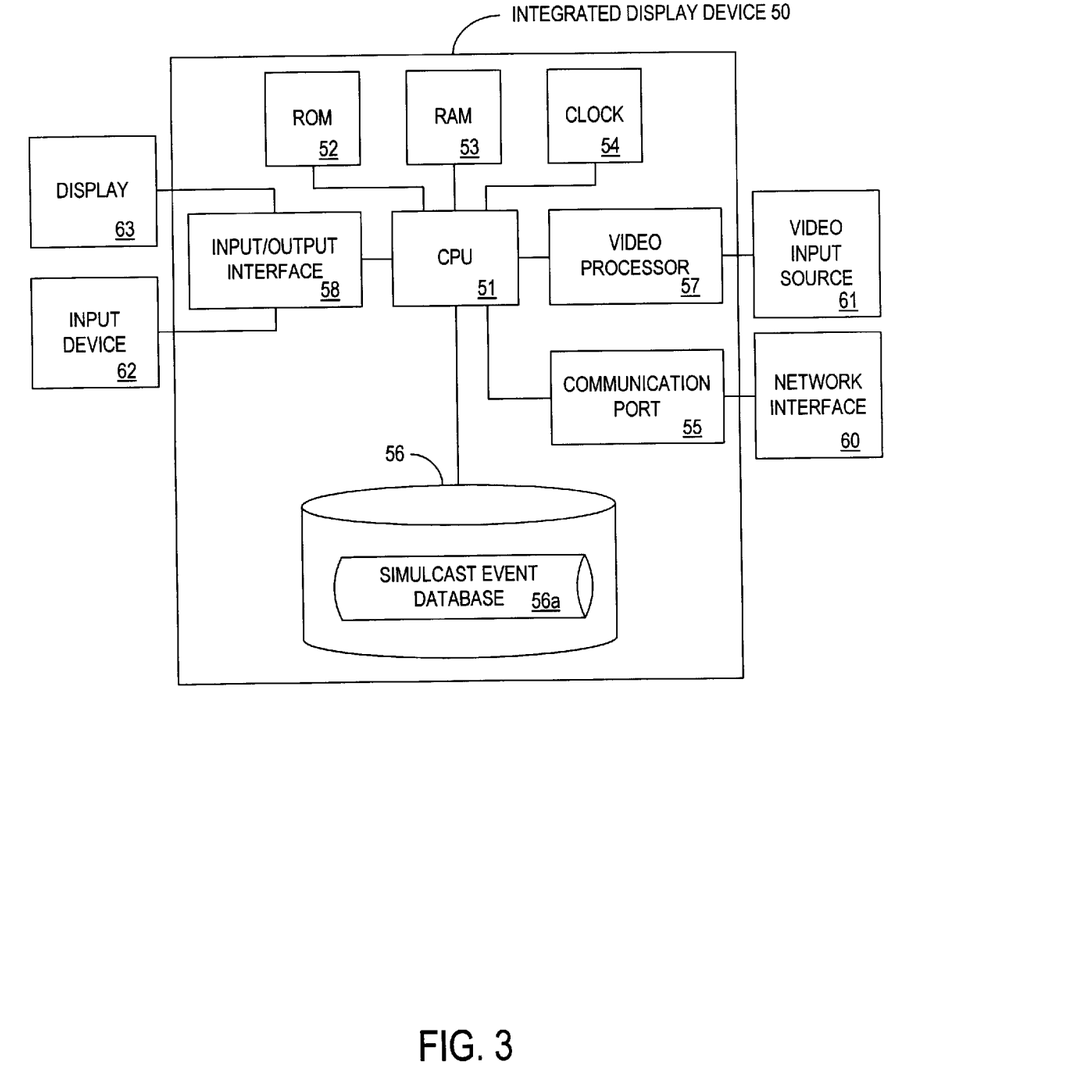
FIG. 3 is a schematic block diagram illustrating the preferred integrated display device of the present invention.

FIG. 3 is a schematic block diagram illustrating a preferred integrated display device 50 of the present invention. This device integrates the functions of the television receiver 30 and the personal computer 40 discussed above. The integrated display device 50 allows the video program and the supplemental information to be viewed on a single display 63. Any one or a variety of display apparatuses are suitable for this purpose, including, for example a Cathode Ray Tube ("CRT"), Liquid Crystal Display ("LCD"), or similar apparatus capable of displaying high resolution color video signals. The display 63 has segregated sections to display the video program, the supplemental information and a control/menu section (not shown). An input/output interface 58 transmits the outgoing video/control signal to the display 63.

The integrated display device 50 includes a CPU 51 which performs the processing functions. The device 50 also includes a read only memory 52 (ROM) and a random access memory 53 (RAM). The ROM 52 is used to store at least some of the program instructions that are to be executed by the CPU 51, such as portions of the operating system or basic input-output system (BIOS), and the RAM 53 is used for temporary storage of data. A clock 54 provides timing signals which are required by the CPU 51.

The CPU 51 can also store information to, and read information from, a data storage device 56. This storage device preferably includes or is adapted to receive static memory capable of storing large volumes of data, such as one or more of floppy disks, hard disks, CDs, or magnetic tapes.

The data storage device 56 includes a simulcast event database 56a. This database is described more fully with reference to FIG. 5, below. In addition, the data storage device 56 includes instructions which can be read by and executed by the CPU 51, thereby enabling the CPU 51 to process requests for supplemental information and control the data flow therein. Additional databases may be added as needed to store a variety of other information that may be required for other purposes.

The integrated display device 50 also includes a communication port 55 connected to a computer data communication network interface 60. The communication port 55 enables the CPU 51 to communicate with external devices, in particular, with the web site server 70 discussed above. The network interface 60 serves as an interface between the CPU 51, via the communication port 55, and the web site server 70. Network interface 60 is capable of receiving data streams from both the CPU 51 and the web site server 70, and the data streams are formatted according to their respective communication protocols. Network interface 60 can also reformat the data streams appropriately and relay the data streams accordingly. Network interface 60 preferably can handle a variety of different communication protocols.

A video processor 57 is used by the integrated display device 50 to receive video signals from a video input source 61. The video signals can be in either an analog or digital format. These signals are converted into a digital format suitable for storage and manipulation by the CPU 51.

An input device 62 is also connected to the input/output interface 58. The input device 62 is used to facilitate input of data by the viewer from either a mouse or keyboard. However, other input devices would be suitable for this purpose as well, including, for example, joysticks, trackballs, infra-red hand-held remote control units, video cameras, or even speech recognition devices. The input device 62 may interface to CPU 51 via interface circuitry, as shown in FIG. 3. Alternatively, input device 62 may directly interface with the CPU 51. The input device 62 may also comprise a floppy disk drive, CD-ROM drive, or other such devices which are capable of reading data from computer readable media.

Figure 5:
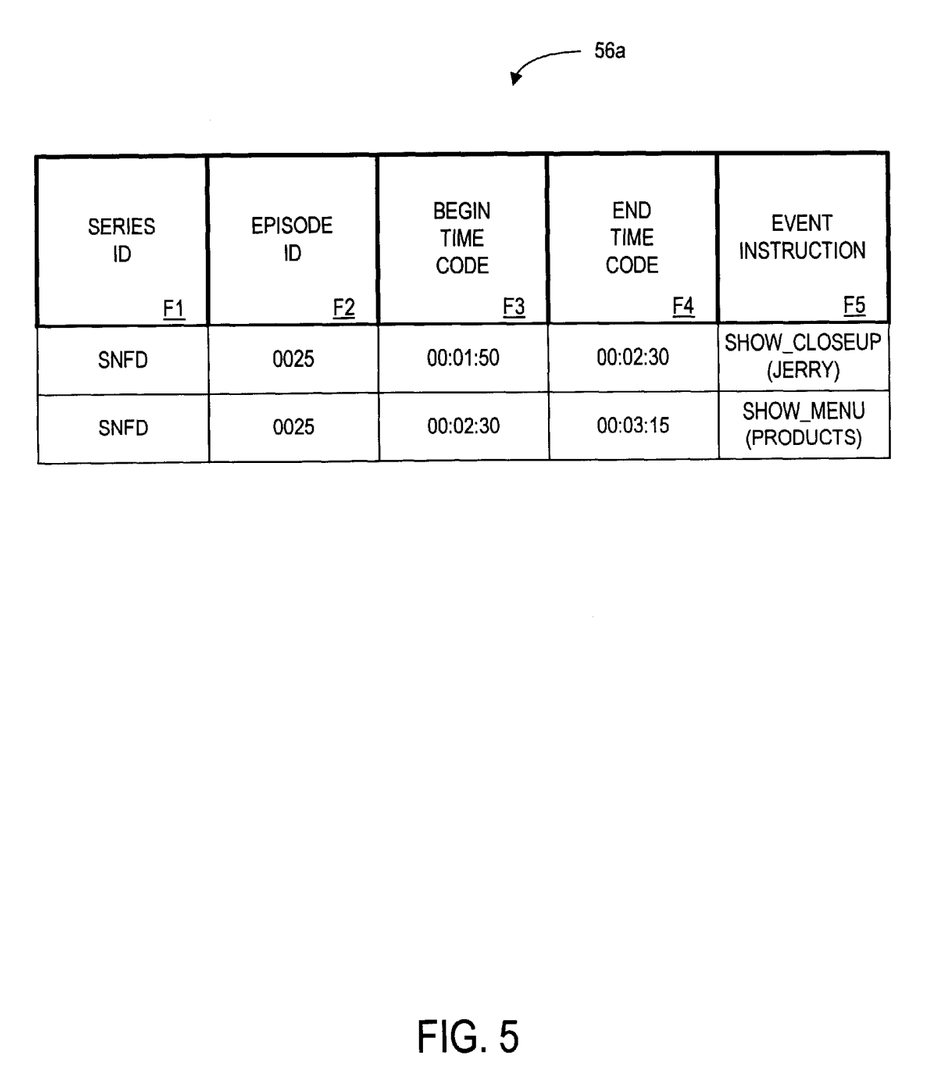
FIG. 5 is a table depicting the simulcast event database within the integrated display device of FIG. 3.

FIG. 5 shows an example of the simulcast event database 56a within the integrated display device 50. The simulcast event database 56a comprises information related to the supplemental information available for each video program. This database includes a series ID field F1, an episode ID field F2, a begin time code field F3, an end time code field F4, and an event instruction field F5. The series ID field F1 corresponds to the first four digits of the program identification information 33 associated with each video program, while the episode ID field F2 corresponds to the last four digits. The begin and end time code fields F3 and F4, respectively, indicate when certain events related to the supplemental information are to occur as discussed above. These events are synchronized to the video program using the synchronization information 32 (i.e., the time-code). The event instruction field F5 indicates the type of events (i.e., supplemental information) that the viewer will receive at the specified times within the video program.

While only two records are depicted in FIG. 5, any number of records may be stored. To conserve storage space on the data storage device 56, records may be transferred to a different storage device or deleted after some predetermined time interval or after a predetermined event (e.g., after the video program has have been viewed).

The information stored in the simulcast event database 56a can be updated in a number of ways. The integrated display device 50 may communicate with the web site server 70 and download the information related to one or more video programs. This may be done before or during the viewing of the video program. It is understood that the information stored within the simulcast event database 56a may be updated as needed.

In an alternative embodiment, the supplemental information can be downloaded into the simulcast event database 56a from a computer readable medium, such as a CD-ROM, floppy disk, and the like. In this embodiment, the integrated display device 50 would execute a stand-alone computer application designed to synchronize and display the supplemental information. The computer application could be distributed, for example, via a CD-ROM or the Internet.

The personal computer 40 could also execute a stand-alone computer application coupled with an integrated simulcast event database 56a to provide synchronized supplemental information to the viewer. In this embodiment, the viewer would not be required to access the web site server 70 each time supplemental information related to a particular video program was desired. The viewer would simply download the computer application and the simulcast event database 56a beforehand and execute the computer application when viewing the video program. Alternatively, as discussed above, the computer application and database could be distributed using other means such as a CD-ROM.

Figure 4:
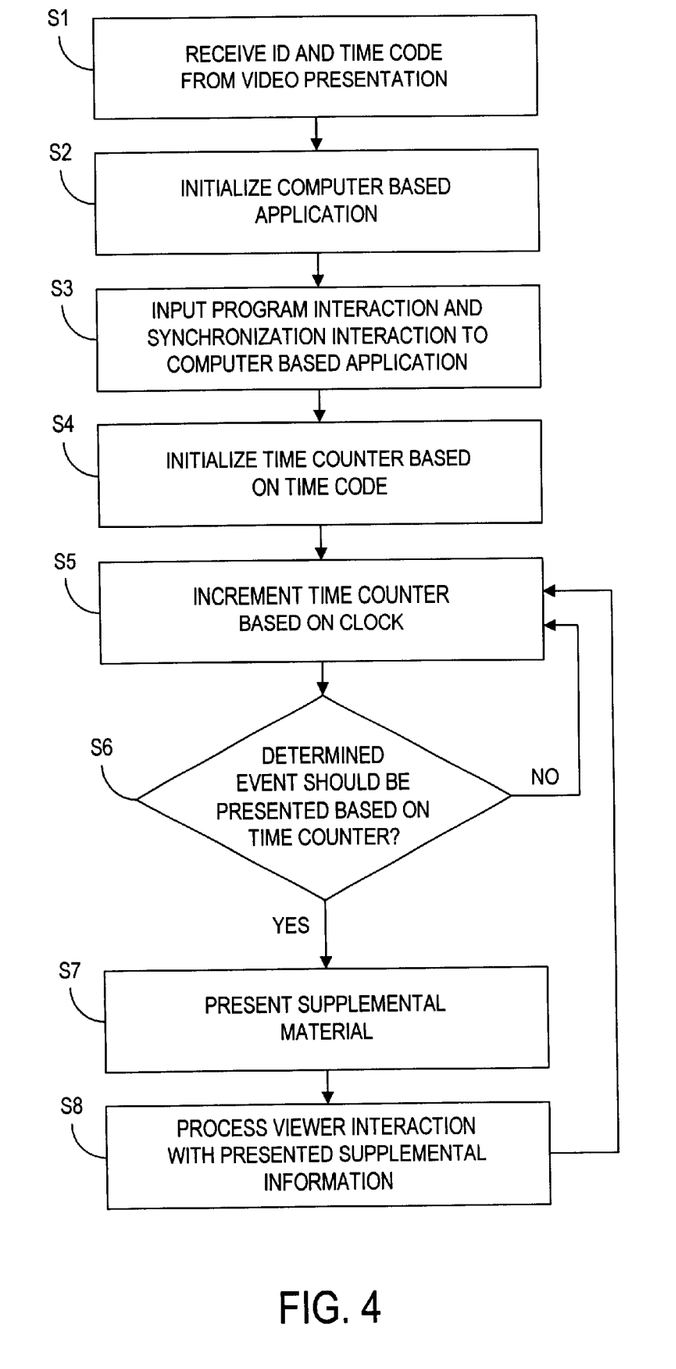
FIG. 4 is a flow chart illustrating a preferred method of presenting supplemental information in accordance with the integrated display device of FIG. 3.

FIG. 4 is a flow chart of the exemplary operation of the stand-alone computer application for presenting the supplemental information. The process will be described with reference to integrated display device 50, however, the method could also be implemented using personal computer 40. The process starts when the viewer receives the program identification information 33 and the synchronization information 32 displayed on display screen 63 while viewing the video program in step S1. In step S2, the computer application is initialized by the viewer 80. This can be performed, for example, using a mouse to double click an icon representing the computer application. The viewer is then prompted to enter the program identification information 33 and the synchronization information 32 via the input device 62 in step S3.

After entering the synchronization information 32 consisting of the time-code, viewer 80 can optionally adjust the entered time-code to ensure a close match with the running time-code contained within the video program. In particular, pop-up messages and menu selections prompt and guide the viewer to adjust the time-code using the input device 62. This can also be accomplished using the keyboard or mouse (not shown) of the personal computer 40.

In step S4, the program identification information 33 is processed. Based on the program identification information 33 entered by viewer 80, the CPU 51 obtains the appropriate supplemental information stored in the simulcast event database 56a or accessible by the CPU 51 via external means (i.e., from a CD-ROM or the web site server 70). The CPU 51 also initializes a time counter based on the synchronization information and updates the time counter based on timing signals from internal clock. The time-code entered by viewer 80 is incremented (step S5) at predetermined intervals (e.g., every second) to ensure that proper synchronization is maintained with the video program.

The CPU 51 determines in step S6 when to present specific events (part of the supplemental information) based on the continually updated time counter. For example, when the updated time counter is greater-than or equal to the BEGIN-TIME but less-than the END-TIME for a specific event, that event is presented to viewer 80. The first event presented to the viewer is thereby synchronized to the video program. The first event is off-set using the time-code information, so that proper synchronization with the video program is maintained.

In step S7, the integrated display device 50 displays the event synchronized to the action occurring on the video program.

As discussed above, viewer 80 may also select various options while the supplemental information is being presented. When optional or selectable information is available, viewer 80 is prompted by various means such as: pop windows, menu choices, dialog boxes, etc. appearing on the display 63. Methods of implementing these applications will be apparent to those skilled in the art, and will not be further described in the present disclosure. Viewer 80 can then exercise an option via an input device such as input device 62. In step S8, the response of viewer 80 is processed and the appropriate supplemental information is presented accordingly.

The process then loops back to step S5 and is repeated until the end of the video program or viewer 80 terminates the computer application.

In an alternative embodiment, the program identification information 33 and the synchronization information 32 may be derived by the integrated display device 50 directly from the video program. The video processor 57 of the integrated display device 50 extracts the necessary information as needed. Since this process would be transparent to the viewer 80, the information would not need to be visually displayed.

While the present invention has been described above in terms of specific embodiments, it is to be understood that the invention is not intended to be confined or limited to the embodiments disclosed herein. On the contrary, the present invention is intended to cover various methods, structures and modifications thereof included within the spirit and scope of the appended claims.

What is claimed is:

1. A server apparatus for providing supplemental information, comprising:
   a controller;
   a storage device operatively connected to said controller;
   a receiver/transmitter, adapted for communicating with said controller, for receiving over a data communication network a request for supplemental information related to a video program and for receiving synchronization information related to the video program, and for relaying the request and the synchronization information to said controller; and
   said storage device in said controller containing a program, adapted to be executed by said controller, for processing the request for supplemental information, synchronizing the supplemental information to the video program, and for transmitting the synchronized supplemental information through said receiver/transmitter over the data communication network.

2. The apparatus according to claim 1, wherein the supplemental information comprises audio and visual information recorded on a recording medium.

3. The apparatus according to claim 2, wherein said storage device contains a database to store the supplemental information, and said program within said storage device is further adapted to perform database maintenance.

4. The apparatus according to claim 1, said program is further adapted for receiving program identification information related to the video program and for transmitting the program identification information through said receiver/transmitter over the data communication network.

5. The apparatus according to claim 1, wherein the synchronization information comprises a time-code; and
   said program is further adapted to update said time-code at predetermined intervals.

6. The apparatus according to claim 1, wherein said receiver/transmitter is adapted for receiving additional requests from a requestor to interactively change the requested supplemental information based upon the viewed program; and
   said program is further adapted to change and transmit the requested supplemental information in accordance with the additional requests from the requestor.

7. A method for providing supplemental information using a data processing apparatus including a CPU and a storage device operatively connected to the CPU and containing a program adapted to be executed by the CPU for processing a request for the supplemental information related to a video program and providing the requested supplemental information, said method comprising the steps of:
   receiving a request for the supplemental information related to the video program;
   receiving synchronization information related to the video program;
   processing the request for the supplemental information by having the CPU in the data processing apparatus execute the program;
   synchronizing the requested supplemental information to the video program using the synchronization information; and
   transmitting the requested supplemental information.

8. The method according to claim 7, wherein the requested supplemental information comprises audio and visual information.

9. The method according to claim 7, further comprising the step of providing program identification information prior to processing the request.

10. The method according to claim 7, wherein the synchronization information comprises a time-code which is updated at predetermined intervals.

11. The method according to claim 7, further comprising the step of:
    receiving additional requests to interactively change the requested supplemental information based upon the viewed video program; and
    changing the requested supplemental information in accordance with the additional requests.

12. Computer executable process steps, stored on a computer readable medium, for processing a request for supplemental information related to a video program, comprising:
    a step to receive a request for the supplemental information;
    a step to receive program identification information;
    a step to receive synchronization information;
    a step to process the program identification information;
    a step to retrieve the requested supplemental information in accordance with the program identification information;
    a step to synchronize the requested supplemental information to the video program in accordance with the synchronization information; and a step to output the synchronized requested supplemental information.

13. The computer executable process according to claim 12, further comprising a step to change the synchronized requested supplemental information based on additional instructions.

14. The computer executable process according to claim 12, further comprising the step of verifying that synchronization is maintained with the video program.

15. The computer executable process according to claim 12, wherein the synchronization information comprises a time-code which is updated at predetermined intervals.

16. A system, comprising:
a display device configured to receive a video program, said video program including an audio component and a visual component, wherein said video program includes synchronization information; and
a data processing apparatus including a CPU and a storage device operatively connected to said CPU, said storage device containing a program, adapted to be executed by said CPU, for transmitting a request for supplemental information relating to said video program, for transmitting information corresponding to said synchronization information, for receiving the supplemental information, and for displaying the supplemental information that is synchronized to said video program in accordance with said synchronization information.

17. The system according to claim 16, wherein said display device and said data processing apparatus are integrated.

18. The system according to claim 16, wherein the supplemental information is received via a computer data communication network interface.

19. The system according to claim 16, wherein said visual component of said video program contains said synchronization information.

20. The system according to claim 16, wherein the program is further adapted to transmit the request for the supplemental information via a computer network interface to a server, and where said server transmits, in response, the requested supplemental information.

21. The system according to claim 16, wherein the program is further adapted to transmit program identification information and the synchronization information via a computer network interface.

22. The system according to claim 16, wherein the program is further adapted to make additional requests to interactively change the supplemental information.

23. The system according to claim 16, wherein said video program is selected from the group consisting of a live television broadcast and a prerecorded television broadcast.

24. The system according to claim 16, where said system further comprises a reader, adapted to retrieve data from a computer readable medium, operatively connected to said data processing apparatus, and where the supplemental information is received from said reader which retrieves the supplemental information from said computer readable medium.

25. The system according to claim 24, wherein said reader is a CD-ROM device.

26. A method for receiving supplemental information related to a video program using a display device for displaying the video program and a data processing apparatus including a CPU and a storage device operatively connected to the CPU and containing a program adapted to be executed by the CPU for requesting the supplemental information and for displaying the supplemental information, comprising the steps of:

displaying the video program on the display device, where the video program includes an audio component, a visual component and synchronization information;
initiating the program;
requesting the supplemental information;
transmitting information corresponding to the synchronization information from the video program;
receiving the supplemental information synchronized to the video program; and
displaying, via the data processing apparatus, the supplemental information.

27. A method for receiving supplemental information, comprising the steps of:
displaying a video program including an audio component, a visual component and synchronization information;
initiating a computer program adapted to process a request for supplemental information related to the action and events occurring within the video program;
requesting the supplemental information;
transmitting information corresponding to the synchronization information from the video program;
receiving the supplemental information; and
displaying the requested supplemental information, synchronized to the video program in accordance with synchronization information.

28. The method according to claim 27, wherein the visual component of the video program contains program identification information related to the video program.

29. The method according to claim 27, wherein the visual component of the video program contains the synchronization information.

30. A method according to claim 29, wherein the synchronization information comprises a time-code that is changed at predetermined intervals and which is used to synchronize the supplemental information to the video program.

31. The method according to claim 27, further comprising the step of making additional requests to change, interactively, the requested supplemental information.

32. A method of receiving supplemental information related to a video program that includes an audio component and a visual component, comprising the steps of:
viewing the video program;
receiving program identification information and synchronization information related to the video program;
requesting the supplemental information;
providing the synchronization information and program identification information;
receiving the supplemental information; and
viewing supplemental information while the video program is in progress.

33. A method according to claim 32, wherein the step of receiving synchronization information comprises receiving a time-code which is updated at predetermined intervals.

34. A method according to claim 32, further including the step of paying for the supplemental information.

35. A method according to claim 34, wherein the step of paying for the supplemental information is accomplished by a credit card transaction.

36. A method according to claim 34, wherein said step of paying for the supplemental information is performed through payment of a service statement.

37. A method according to claim 32, further comprising the step of making additional requests to change the requested supplemental information.

38. A method according to claim 32, further comprising the step of initiating a computer application program for processing the request for supplemental information made in said requesting step.

39. A system, comprising:
- a data processing apparatus including a CPU and a memory operatively connected to said CPU;
- said memory containing a first program, adapted to be executed by said CPU, for requesting supplemental information related to a video program, for transmitting synchronization information related to the video program, for receiving the requested supplemental information via a data communication network, and for displaying the supplemental information;
- a server including a controller and a storage device operatively connected to said controller; and
- said storage device contains a second program, adapted to be executed by the controller, for processing the request for supplemental information, for receiving synchronization information, for synchronizing the supplemental information to the video program, and for transmitting the synchronized supplemental information through the data communication network to said data processing system.

40. A method for providing supplemental information related to a video program using a data processing apparatus including a CPU and a memory operatively connected to the CPU and containing a first program adapted to be executed by the CPU for requesting the supplemental information, and a server including a controller and a storage device operatively connected to the controller containing a second program adapted to be executed by the controller for processing the request for the supplemental information, comprising the steps of:
- initiating the first program;
- requesting the supplemental information;
- transmitting synchronization information related to the video program to the server;
- processing the request for the supplemental information by having the controller in the server execute the second program;
- synchronizing the requested supplemental information to the video program using the synchronization information;
- receiving, by the data processing apparatus, the synchronized supplemental information; and
- displaying, by the data processing apparatus, the synchronized supplemental information.

41. A system, comprising:
- a display device configured to receive a video program, said video program including an audio component, a visual component and synchronization information;
- a server including a controller and a storage device operatively connected to said controller;
- said storage device contains a first program, adapted to be executed by said controller, for processing a request for supplemental information related to said video program, for receiving information corresponding to said synchronization information, for synchronizing the supplemental information to said video program, and for transmitting the synchronized supplemental information through a data communication network;
- a data processing apparatus including a CPU and a memory operatively connected to said CPU; and
- said memory containing a second program, adapted to be executed by said CPU, for requesting the supplemental information from said server, for transmitting information corresponding to said synchronization information to said server, for receiving the supplemental information via the data communication network, and for displaying the supplemental information synchronized to said video program.

42. A method for providing supplemental information related to a video program using a display device for displaying the video program, a data processing apparatus including a CPU and memory operatively connected to the CPU and containing a first program adapted to be executed by the CPU for requesting the supplemental information, and a server including a controller and a storage device operatively connected to the controller containing a second program adapted to be executed by the controller for processing the requests, comprising the steps of:
- displaying the video program on the display device, where the video program includes an audio component, a visual component and synchronization information;
- initiating the first program;
- requesting the supplemental information;
- transmitting information corresponding to the synchronization information from the video program to the server;
- processing the request for the supplemental information by having the controller in the server execute the second program;
- synchronizing the requested supplemental information to the video program using the information transmitted in said transmitting step;
- receiving, by the data processing apparatus, the synchronized supplemental information; and
- displaying, by the data processing apparatus, the synchronized supplemental information.

43. A signal containing information for requesting supplemental information relating to broadcast program information conveyed by the signal, comprising:
- a broadcast program including a visual component and an audio component for transmission to at least one display device; and
- program identification information and synchronization information included as part of said video component, said program identification information including a code for identifying said program, said synchronization information for synchronizing the supplemental information with the said program,
- wherein said synchronization information is representative of the amount of time elapsed from the start of said broadcast program.

* * * * *

US006263505C1

(12) EX PARTE REEXAMINATION CERTIFICATE (10715th)
United States Patent
Walker et al.

(10) Number: US 6,263,505 C1
(45) Certificate Issued: Sep. 22, 2015

(54) SYSTEM AND METHOD FOR SUPPLYING SUPPLEMENTAL INFORMATION FOR VIDEO PROGRAMS (75) Inventors: Jay S. Walker, Ridgefield, CT (US); James A. Jorasch, Stamford, CT (US); Robert R. Lech, Norwalk, CT (US); Thomas M. Sparico, Riverside, CT (US)

(73) Assignee: WALKER DIGITAL, LLC, Stamford, CT (US)

Reexamination Request:
No. 90/009,918, Jun. 23, 2011

Reexamination Certificate for:
Patent No.: 6,263,505
Issued: Jul. 17, 2001
Appl. No.: 08/886,006
Filed: Jul. 3, 1997

Related U.S. Application Data

(63) Continuation-in-part of application No. 08/821,436, filed on Mar. 21, 1997, now Pat. No. 6,209,028.

(51) Int. Cl.
*H04N 7/173* (2011.01)
*H04N 7/24* (2011.01)

(52) U.S. Cl.
CPC .................. *H04N 7/17318* (2013.01)

(58) Field of Classification Search
None
See application file for complete search history.

(56) References Cited

To view the complete listing of prior art documents cited during the proceeding for Reexamination Control Number 90/009,918, please refer to the USPTO's public Patent Application Information Retrieval (PAIR) system under the Display References tab.

*Primary Examiner* — Kenneth J Whittington (57) ABSTRACT

An apparatus, method, and program for providing supplemental information related to video programs. Through a computer network interface, a user can request and receive specific supplemental audio/video information related to a video program. Alternatively, the supplemental audio/video information can be retrieved from a CD-ROM, or similar storage device. The video program can be, for example, a live broadcast television program or a time-shifted tape recording of a television program. The supplemental information is synchronized to the video program by using a time code which is integrated with the video program. This enables the supplemental information to be viewed and/or listened to in harmony with the events or action of the video program.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-43 are cancelled.

\* \* \* \* \*